(12) United States Patent
Wu et al.

(10) Patent No.: US 10,277,453 B2
(45) Date of Patent: Apr. 30, 2019

(54) MASTER BASE STATION-CONTROLLED RESPONSE TO DETECTED FAILURE OF RADIO LINK BETWEEN SECONDARY BASE STATION AND MOBILE STATION IN DUAL CONNECTIVITY WIRELESS NETWORKS

(71) Applicant: NOKIA SOLUTIONS AND NETWORKS OY, Espoo (FI)

(72) Inventors: Chunli Wu, Beijing (CN); Benoist Pierre Sebire, Tokyo (JP)

(73) Assignee: Nokia Solutions and Networks Oy, Espoo (FI)

( * ) Notice: Subject to any disclaimer, the term of this patent is extended or adjusted under 35 U.S.C. 154(b) by 61 days.

(21) Appl. No.: 14/900,929

(22) PCT Filed: Jun. 28, 2013

(86) PCT No.: PCT/EP2013/063666
§ 371 (c)(1),
(2) Date: Dec. 22, 2015

(87) PCT Pub. No.: WO2014/206489
PCT Pub. Date: Dec. 31, 2014

(65) Prior Publication Data
US 2016/0182276 A1    Jun. 23, 2016

(51) Int. Cl.
*H04L 12/24*    (2006.01)
*H04W 36/00*    (2009.01)
(Continued)

(52) U.S. Cl.
CPC ..... *H04L 41/0654* (2013.01); *H04W 36/0069* (2018.08); *H04W 76/19* (2018.02); *H04W 76/15* (2018.02); *H04W 88/06* (2013.01)

(58) Field of Classification Search
CPC ............ H04L 41/0654; H04W 76/028; H04W 88/06; H04W 76/025; H04W 36/0069; H04W 76/19; H04W 76/15
See application file for complete search history.

(56) References Cited

U.S. PATENT DOCUMENTS

2009/0316586 A1* 12/2009 Yi ....................... H04W 74/002
370/242
2011/0286327 A1    11/2011 Chen et al.
(Continued)

FOREIGN PATENT DOCUMENTS

WO    2010088329 A1    8/2010
WO    2011/100673 A1    8/2011

OTHER PUBLICATIONS

Seidel, Eiko, "LTE-A Carrier Aggregation Enhancements in Release 11", NOMOR Research GmbH, Aug. 2012, 6 pages.
(Continued)

*Primary Examiner* — Kwang B Yao
*Assistant Examiner* — Moo Jeong
(74) *Attorney, Agent, or Firm* — Brake Hughes Bellermann LLP (57) ABSTRACT

Various example embodiments are disclosed herein. A technique is provided for controlling a response by a mobile station (MS) to a radio link failure detected by the MS in a dual connectivity wireless network in which the MS is connected to both a master base station (master BS) associated with a primary cell and a secondary base station (secondary BS) associated with a secondary cell. The MS may detect a radio link failure for a radio link between the MS and the secondary BS. In response to detecting the radio link failure, the MS may perform one of several preconfigured responses, or the MS may notify the master BS of the radio link failure, receive an instruction from the master BS,
(Continued)

and then perform operations or respond to the radio link failure according to the received instruction.

17 Claims, 6 Drawing Sheets

(51) Int. Cl.
    *H04W 76/19* (2018.01)
    *H04W 76/15* (2018.01)
    *H04W 88/06* (2009.01)

(56) References Cited

U.S. PATENT DOCUMENTS

| | | | |
|---|---|---|---|
| 2014/0056243 A1* | 2/2014 | Pelletier | H04W 74/04 370/329 |
| 2016/0007403 A1* | 1/2016 | Futaki | H04L 5/001 370/338 |
| 2016/0037579 A1* | 2/2016 | Jung | H04W 24/04 370/252 |

OTHER PUBLICATIONS

NTT Docomo et al., "3GPP TSG-RAN2 #69bis; R2-102488; CA UL/DL CC failures", 3GPP Draft; vol. RAN WG2, Beijing China, Feb. 15-19, XP050422725.

InterDigital Communications, "RACH Procedure for SCell TA", 3GPP TSG-RAN WG2 #75, Tdoc R2-114267, Athens, Greece, Aug. 22-26, 2011, 4 pages.

CATT, "SCell RA failure", 3GPP TSG RAN WG2 Meeting #76, R2-115793, San Francisco, USA, Nov. 14-18, 2011, 2 pages.

Nokia Siemens Networks et al., "Data split options and considerations on U-plane protocol architecture for dual-connectivity", 3GPP TSG-RAN WG2 Meeting #81 bis, R2-131054, Chicago, USA, Apr. 15-19, 2013, 9 pages.

NTT Docomo, Inc., "New Study Item Description: Small Cell enhancements for E-UTRA and E-UTRAN—Higher-layer aspects", 3GPP TSG-RAN Meeting#58, RP-122033, Barcelona, Spain, Dec. 4-7, 2012, 5 pages.

3GPP TS 36.322 V11.0.0 (Sep. 2012), 3rd Generation Partnership Project; Technical Specification Group Radio Access Network; Evolved Universal Terrestrial Radio Access (E-UTRA); Radio Link Control (RLC) protocol specification (Release 11), 39 pages.

3GPP TR 36.842 V02.0 (May 2013), 3rd Generation Partnership Project; Technical Specification Group Radio Access Network; Evolved Universal Terrestrial Radio Access (E-UTRA); Study on Small Cell Enhancements for E-UTRA and E-UTRAN—Higher layer aspects (Release 12), 38 pages.

ETSI TS 136 300 V11.5.0 (Apr. 2013), LTE; Evolved Universal Terrestrial Radio Access (E-UTRA) and Evolved Universal Terrestrial Radio Access Network (E-UTRAN); Overall description; Stage 2 (3GPP TS 36.300 version 11.5.0 Release 11), 223 pages.

ETSI TS 136 321 V11.2.0 (Apr. 2013), LTE; Evolved Universal Terrestrial Radio Access (E-UTRA); Medium Access Control (MAC) protocol specification (3GPP TS 36.321 version 11.2.0 Release 11), 58 pages.

ETSI TS 136 331 V11.3.0 (Apr. 2013), LTE; Evolved Universal Terrestrial Radio Access (E-UTRA); Radio Resource Control (RRC); Protocol specification (3GPP TS 36.331 version 11.3.0 Release 11), 348 pages.

ETSI TS 136 423 V11.5.0 (Jul. 2013), LTE; Evolved Universal Terrestrial Radio Access Network (E-UTRAN); X2 Application Protocol (X2AP) (3GPP TS 36.423 version 11.5.0 Release 11), 145 pages.

ETSI TS 136 424 V11.0.0 (Oct. 2012), LTE; Evolved Universal Terrestrial Radio Access Network (E-UTRAN); X2 data transport (3GPP TS 36.424 version 11.0.0 Release 11), 10 pages.

Office Action for European Application 13732918.1, dated Nov. 16, 2018, 27 pages.

3GPP TSG-RAN2 #102; R2-1806881; "UE Behaviours for SCell RLF"; May 21-25, 2018; Busan, Korea; 2 pages.

* cited by examiner

FIG. 1

Radio Link Failure Notification
310

MASTER BASE STATION-CONTROLLED RESPONSE TO DETECTED FAILURE OF RADIO LINK BETWEEN SECONDARY BASE STATION AND MOBILE STATION IN DUAL CONNECTIVITY WIRELESS NETWORKS

This application is a national stage entry of PCT Application No. PCT/EP2013/063666, filed Jun. 28, 2013, entitled "MASTER BASE STATION-CONTROLLED RESPONSE TO DETECTED FAILURE OF RADIO LINK BETWEEN SECONDARY BASE STATION AND MOBILE STATION IN DUAL CONNECTIVITY WIRELESS NETWORKS" which is hereby incorporated by reference in its entirety.

TECHNICAL FIELD

This description relates to wireless networks.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the $3^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations, which are referred to as enhanced Node Bs (eNBs), provide wireless access within a coverage area or cell. In LTE, mobile devices, or mobile stations are referred to as a user equipment (UE). LTE has included a number of improvements or developments.

SUMMARY

According to an example implementation, a method may include detecting, by a mobile station, a radio link failure for a radio link between a mobile station (MS) and a secondary base station (secondary BS), where the MS is connected to both a master BS associated with a primary cell and the secondary BS associated with a secondary cell in a dual connectivity wireless network.

According to another example implementation, an apparatus may include a processor. The processor may be configured to cause the apparatus to detect, by the MS, a radio link failure for a radio link between the MS and the secondary BS.

The apparatus may be further caused to suspend, by the MS, a radio link control (RLC) entity of the MS that is associated with the failed logical channel (or failed bearer) of the radio link, and send a radio link failure notification from the MS to the master BS, the radio link failure notification including a secondary BS ID to identify the secondary BS and a logical channel ID identifying a failed logical channel of the failed radio link.

In one example implementation, the apparatus may be further caused to receive, by the MS from the master BS, an instruction to re-establish the suspended RLC entity of the MS associated with the failed logical channel, and re-establish the RLC entity associated with the failed logical channel in response to receiving the instruction.

In another example implementation, the apparatus may be further caused to receive, by the MS from the master BS, an instruction to re-establish the RLC entities of the MS associated with all of the logical channels of the failed radio link between the MS and the secondary BS, and re-establish, by the MS in response to receiving the instruction, the RLC entities of the MS associated with all of the logical channels of the failed radio link between the MS and secondary BS.

In another example implementation, the apparatus may be further caused to receive, by the MS from the master BS, an instruction to initiate a link or connection re-establishment procedure, and initiate, by the MS, the link or connection re-establishment procedure in response to receiving the instruction.

In another example implementation, a method is provided for controlling a response to a radio link failure in a dual connectivity wireless network in which a mobile station (MS) is connected to both a master base station (master BS) associated with a primary cell and a secondary base station (secondary BS) associated with a secondary cell. The method may include detecting, by the MS, a radio link failure for a logical channel of a radio link between the MS and the secondary BS, suspending a radio link control (RLC) entity of the MS that is associated with the logical channel of the radio link, and sending a radio link failure notification to the master BS that includes a BS ID to identify the secondary BS and/or a logical channel ID identifying the failed logical channel of the failed radio link.

In one example implementation, the method may further include receiving, by the MS from the master BS, an instruction, and re-establishing at least the RLC entity associated with the failed logical channel in response to receiving the instruction. In another example implementation, the method may further include the MS re-establishing, in response to receiving the instruction, the RLC entities of the MS associated with all of the logical channels of the failed radio link between the MS and secondary BS. In yet another example implementation, the re-establishing may include the MS initiating a link or connection re-establishment procedure in response to receiving the instruction.

In another example implementation, a computer program product is provided, the computer program product including a non-transitory computer-readable storage medium and storing executable code that, when executed by at least one data processing apparatus, is configured to cause the at least one data processing apparatus to perform a method including: receiving, by a mobile station (MS), a pre-configuration instruction from a master base station (master BS) in a dual connectivity wireless network in which the MS is connected to both the master BS and a secondary BS, the instruction pre-configuring the MS to perform at least one of the following operations in response to the MS detecting a failure of a logical channel (or bearer) of a failed radio link between the MS and a secondary BS: 1) re-establish a RLC (radio link control) entity associated with the failed logical channel (or failed bearer); 2) re-establish RLC entities of the MS associated with all of a plurality of logical channels of the failed radio link between the MS and the secondary BS; 3) suspend a RLC (radio link control) entity associated with the failed logical channel (or failed bearer); 4) suspend RLC entities of the MS associated with all of a plurality of logical channels of the failed radio link between the MS and the secondary BS; and, 5) initiate a link or connection re-establishment procedure. The re-establish operations 1) and 2) and the initiate operation 5) may also include the RLC resuming transmission/reception of data/traffic associated with the failed radio link (or the failed logical channel or failed radio bearer). The method further includes detecting, by the MS, a failure of a logical channel (or bearer) of a radio link between the MS and the secondary BS, and the MS responding to the detecting according to the received pre-configuration instruction from the master BS. In the event that the MS is pre-configured to perform either the suspend operation 3) or suspend operation 4) in response to detecting a failed radio link (e.g., failed logical channel or failed bearer), the MS may send a radio link failure notification to the master BS after performing the suspend operation. The MS may then receive a further instruction from the master BS, which may be, for example, an instruction to perform either re-establish operation 1), re-establish operation 2), or initiate operation 5), noted above. The MS may then perform this additional operation in accordance with the received instruction.

The details of one or more implementations are set forth in the accompanying drawings and the description below. Other features will be apparent from the description and drawings, and from the claims.

DETAILED DESCRIPTION

A technique is provided for controlling a response by a mobile station (MS) to a radio link failure detected by the MS in a dual connectivity wireless network in which the MS is connected (simultaneously) to both a master base station (master BS) associated with a primary cell and a secondary base station (secondary BS) associated with a secondary cell. The MS may detect a radio link failure for a radio link between the MS and the secondary BS. The detected failure in the radio link may be, for example, a failure in one of the bearers or one of the logical channels of the radio link. A variety of different techniques may be used to detect the radio link failure (or the failure in a bearer or logical channel of the radio link). In response to detecting the radio link failure, the MS may perform one of several possible pre-configured responses/operations, e.g., based on the MS receiving a pre-configuration instruction from the master BS prior to the detected radio link failure.

In an example implementation, the MS may be pre-configured (e.g., based on receiving a pre-configuration instruction from master BS) to perform one (or more) of the following operations in response to detecting a failed radio link (e.g., detecting a failed logical channel or failed radio bearer): 1) re-establish a RLC (radio link control) entity associated with the failed logical channel (or failed bearer); 2) re-establish RLC entities of the MS associated with all of a plurality of logical channels of the failed radio link between the MS and the secondary BS; 3) suspend a RLC (radio link control) entity associated with the failed logical channel (or failed bearer); 4) suspend RLC entities of the MS associated with all of a plurality of logical channels of the failed radio link between the MS and the secondary BS; and, 5) initiate a link or connection re-establishment procedure.

According to an example implementation, if the MS is pre-configured to either 3) suspend a RLC (radio link control) entity associated with the failed logical channel (or failed bearer) or 4) suspend RLC entities of the MS associated with all of a plurality of logical channels of the failed radio link between the MS and the secondary BS, then, in response to detecting the failed radio link (e.g., failed logical channel or failed bearer), the MS may perform the suspend operation, send a radio link failure notification to the master BS, and await further instructions from the master BS. In an example implementation, the MS may then receive an instruction from the master BS that instructs the MS to perform one (or more) of the following operations: 1) re-establish a RLC (radio link control) entity associated with the failed logical channel (or failed bearer); 2) re-establish RLC entities of the MS associated with all of a plurality of logical channels of the failed radio link between the MS and the secondary BS; or 5) initiate a link or connection re-establishment procedure. The MS may then perform the operation as instructed by the master BS.

Alternatively, in response to detecting a radio link failure for a radio link between the MS and secondary BS, the MS may, for example, send a radio link failure notification to the master BS that may include a logical channel ID or a bearer ID (identifying the failed logical channel or failed bearer), and/or a BS ID identifying the secondary BS. The MS may suspend the RLC entity associated with the failed logical channel or failed radio bearer. The MS may, for example, then receive an instruction from the master BS that instructs the BS to perform one of the following operations: 1) re-establish a RLC (radio link control) entity associated with the failed logical channel/or failed bearer; 2) re-establish RLC entities of the MS associated with all of a plurality of logical channels/or plurality of bearers of the failed radio link between the MS and the secondary BS; or 5) initiate a link or connection re-establishment procedure, e.g., which may result in multiple (or even all) protocol entities (e.g., PHY, MAC, RLC . . . ) of the MS that are associated with both the radio link between the MS and master BS and the radio link between the MS and the secondary BS being re-established by the MS. The MS may then perform the operation(s) identified by the instruction from the master BS.

In cellular wireless systems, a base station typically provides wireless services within a cell or area. For example, some cells may provide wide coverage areas, while other cells may provide smaller coverage areas. The smaller radio/wireless coverage area(s) or cells associated with one base station can be located wholly or partially within a larger cell or larger radio coverage area of another base station. According to an example implementation, a mobile station (MS) may communicate with more than one base station or with more than one cell, which may be referred to as dual connectivity, where a MS may be connected to multiple base stations. Release 10 of the E-UTRA specifications introduce carrier aggregation (CA), where two or more component carriers (CCs) are aggregated to support wider transmission bandwidths. Although LTE is used as an example wireless network, the various aspects or details described herein may be applicable to any wireless technology or standard.

Figure 1:
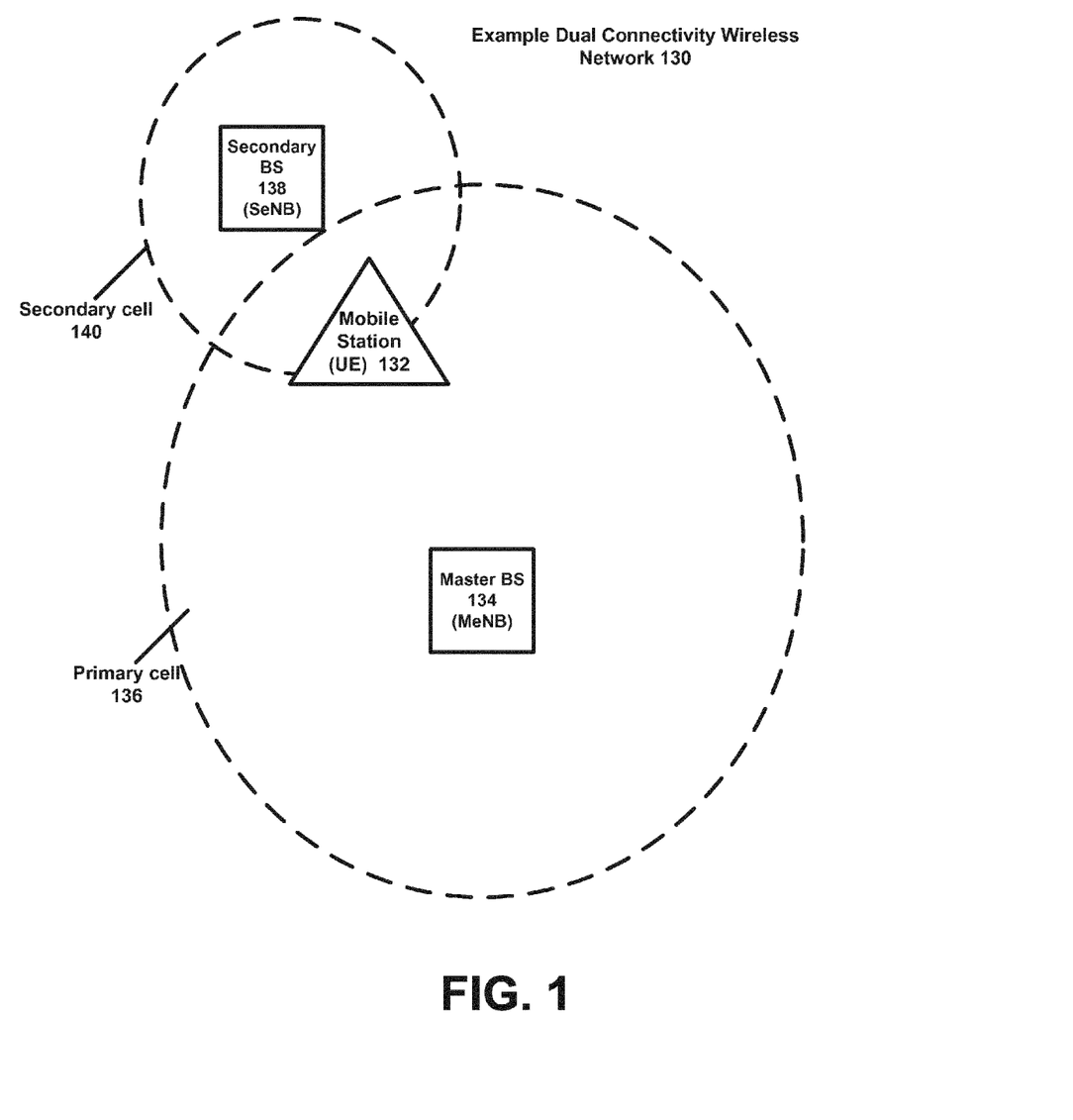
FIG. 1 is a block diagram of a dual connectivity wireless network 130 according to an example implementation.

FIG. 1 is a block diagram of a dual connectivity wireless network 130 according to an example implementation. In the wireless network 130 of FIG. 1, a mobile station (MS) 132, which may also be referred to as a user equipment (UE), may be connected (and in communication) with multiple base stations (BSs), which may also be referred to as enhanced Node Bs (eNBs). The MS 132 may be connected (and in communication) with a master BS 134 (MeNB) which provides wireless coverage within a primary cell 136. The MS 132 may also be simultaneously connected to and/or in communication with a secondary BS 138 (SeNB), which provides wireless coverage within a secondary cell 140.

Therefore, a dual connectivity wireless network allows for a MS (such as MS 132) to be simultaneously connected to multiple base stations, e.g., simultaneously connected to both a master BS (or MeNB) 134, and a secondary BS (SeNB) 138. A dual connectivity wireless network, such as the network 130 shown in FIG. 1 may have several advantages, such as, for example, decreasing a signaling load towards the core network, sharing traffic/packet processing among multiple base stations, as well as benefitting from flexible resource usage where one or more carriers may be used on a radio link between the MS and each BS, e.g., inter-site carrier aggregation. While there are advantages to a MS being connected simultaneously to two or more BSs, this dual connectivity arrangement may present opportunities where at least some kinds of events, functions or operations can or should be coordinated among the connected BSs for a MS, or coordinated between the MS and each connected BS.

Figure 2:
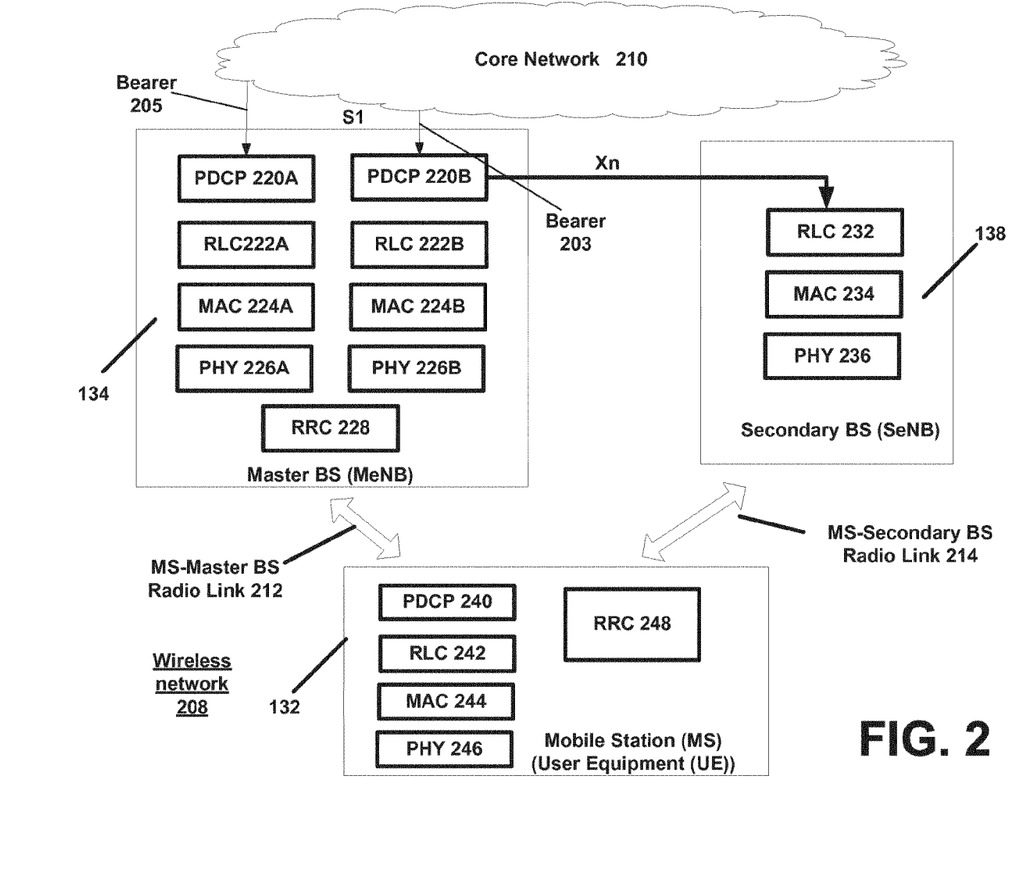
FIG. 2 is a block diagram illustrating a dual connectivity wireless network 208 in more detail according to an example implementation.

FIG. 2 is a block diagram illustrating a dual connectivity wireless network 208 in more detail according to an example implementation. Although not shown, each BS and the MS includes a processor, memory and multiple wireless transceivers (wireless transmitter/receiver). Master BS 134 and secondary BS 138 may be connected via a bidirectional backhaul connection (which may be wired or wireless), which is shown in FIG. 2 as an Xn interface. One or both of BSs 134, 138 may be connected to the core network 210 via a bidirectional S1 interface. A MS 132 may be simultaneously connected to master BS 134 via a MS-master BS radio link 212 and to secondary BS 138 via a MS-secondary BS radio link 214.

MS 132, BS 134 and BS 138 each includes at least one radio protocol stack that may be implemented in hardware and/or software. According to an example implementation, a protocol stack may include logic, and/or computer instructions executed by a processor to perform the functions or operations for each entity of the protocol stack. An example protocol stack for the master BS 134 may include, for example, at least a Packet Data Convergence Protocol (PDCP) entity 220A, a Radio Link Control (RLC) entity 222A, a Media Access Control (MAC) entity 224A, a Physical layer (PHY) entity 226A, and a Radio Resource Control (RRC) entity 228.

The PDCP entity 220A performs ciphering (encryption and decryption of data) and header compression-decompression. There is one PDCP entity 222A per radio bearer configured for a MS. The RLC entity 222A performs segmentation/concatenation, error detection and correction, data retransmission, duplicate detection and in-sequence data delivery to higher layers. According to an example implementation, there may be one RLC entity per radio bearer or multiple RLC entities per radio bearer configured for a MS, and one RLC entity corresponding to one logical channel. According to one example implementation, the radio protocol stack may include two RLC entities per radio bearer. MAC entity 224A performs multiplexing of logical channels (where there may be one or more logical channel per radio bearer), hybrid ARQ retransmissions, inserting of MAC control elements (MAC CEs) used for in-band control signaling, and other MAC-related functions. The BS MAC entity 224A also performs uplink and downlink scheduling (located in MAC entity of each BS). The MAC entity 224A provides services to the RLC in the form of logical channels. The PHY entity 226A handles or performs coding/decoding, modulation/demodulation, multi-antenna mapping, and other physical layer functions.

RRC 228 is responsible for handling a number of functions or procedures related to the Radio Access Network (RAN) (e.g., shown in FIGS. 1-2), including broadcast of system information necessary for the MS to be able to communicate with a cell or BS, transmission of paging messages originating from the core network 210 to notify a MS about incoming connection requests, connection management including setting up bearers and mobility, mobility functions such as cell selection and reselection, and other control related functions.

According to an example implementation, the LTE (for example) Radio Access Network (RAN), which includes a group of BSs or eNBs, provides one or more radio bearers. A radio bearer generally provides a radio/wireless transport service between two points. For example, packets are mapped to bearers according to their QoS (quality of service) requirements and the destination (IP address or MS) of the packets. In an example implementation, a bearer may be identified by a combination of a QoS class identifier (QCI) (identifying a QoS for the packets) and an IP address of a destination MS. A bearer may include packets of multiple services which require the same QoS (delay, priority, etc.) and directed to/from the same IP address/MS address. Some example QoSs may include a guaranteed bit rate (GBR) and a non-guaranteed bit rate (NGBR). According to an example implementation, RRC messages may be sent via signaling radio bearers. While data signals and voice signals may be sent via data radio bearers and voice radio bearers, respectively. A radio bearer may be mapped to one or more logical channels.

Referring to FIG. 2, two bearers are shown, including a first bearer 203, and a second bearer 205. Within master BS 134, a PDCP/RLC/MAC/PHY protocol stack may be provided for each bearer and/or for each logical channel. For example, a protocol stack that may include PDCP entity 220A, RLC entity 222A, MAC entity 224A and PHY entity 226A may be provided to handle or process data for a voice radio bearer (or for a first logical channel) to/from MS 132, while PDCP entity 220B, RLC entity 222B, MAC entity 224B and PHY entity 226B may be provided for a data radio bearer (or for a second logical channel) to/from MS 132. According to one example implementation at a BS, a plurality of PDCP and RLC entities may share a common MAC entity and a common PHY entity.

Secondary BS 138 may include protocol entities that are the same or similar to those of master BS 134. For example, secondary BS 138 may include a RLC entity 232, a MAC entity 234, and a PHY entity 236. However, in one example implementation, secondary BS 138 does not include a PDCP entity, but rather, both master BS 134 and secondary BS 138 rely on a common (or shared) PDCP entity 220B to handle packets (perform PDCP functions) for bearer 203. Thus, a common PDCP entity 220B may be provided or shared among master BS 134 and secondary BS 138 for bearer 203, while each of BS 134 and BS 138 includes separate RLC, MAC and PHY entities. For example, in the downlink direction (traffic or data received from core network 210), data or packets for the bearer 203 may be split into two paths, including a first path within master BS 134 (some of the received traffic passed to RLC entity 222B), and a second path for at least some of the data/traffic for bearer 203 to be directed to RLC entity 232 of secondary BS 138 via Xn interface, for example. In the uplink direction for bearer 203, traffic from the RLC 232/MAC 234 entities of secondary BS 138 and traffic from the RLC 222B/MAC 224B entities of the master BS 134 are both fed or input to common PDCP entity 220B for transmission over core network 210, for example.

MS 132 includes protocol entities that communicate with the peer entities at the master BS 134 and/or secondary BS 138. While only one protocol stack (PDCP, RLC, MAC and PHY) is shown for the MS 132, it should be understood that MS 132 may include at least one protocol stack for communicating with master BS 134 and at least one protocol stack for communicating with secondary BS 138. For example, MS 132 may include for each protocol stack the following protocol entities: PDCP entity 240, RLC entity 242, MAC entity 244, PHY entity 246 and RRC entity 248. These protocol entities at MS 132 may, for example, perform the same or very similar functions as performed by the peer protocol entities of the master BS 134, and/or communicate with the peer entities at one or more BSs.

According to an example implementation, various techniques are disclosed relating to detecting and responding to a radio link failure or failure of a bearer or logical channel of a radio link. For example, radio link 212 may be established between MS 132 and master BS 134, and this radio link may include or may handle one or more bearers, such as bearers 203 and 205. Each bearer may be mapped to (or may include) one or more logical channels. If a bearer is mapped to a single logical channel, then there may be a 1:1 mapping between the bearer and the logical channel. Similarly, a radio link 214 may be established between MS 132 and secondary BS 138. The radio link 214 may include one or more bearers, such as bearer 203, and the bearer may include one or more logical channels.

A method or technique is provided for controlling a response to a radio link failure in a dual connectivity wireless network in which a mobile station (e.g., MS 132) is connected (simultaneously) to both a master base station (e.g., master BS 134) associated with a primary cell and a secondary base station (e.g., secondary BS 138) associated with a secondary cell. The MS may detect a radio link failure for a radio link (e.g., radio link 212 or radio link 214) between the MS and the secondary BS. The detected failure in the radio link may be, for example, a failure in one of the bearers or one of the logical channels of the radio link. A variety of different techniques may be used to detect a radio link failure (or a failure in a bearer or logical channel of a radio link). Several different example techniques are described below for detecting a radio link failure.

An RLC entity that is associated with (e.g., handling or processing packets or SDUs for) a bearer or logical channel of a radio link handles error detection and correction, and performs retransmissions for that bearer or logical channel. For example, if an acknowledgement for a PDU (protocol data unit) is not received by the MS before a timeout, the RLC entity of the MS may retransmit the PDU, and a retransmission counter is incremented. If the retransmission counter reaches a maximum (or threshold) value, and the PDU has not been acknowledged as being received by the BS, then the RLC entity of the MS may declare a radio link failure (e.g., due to a maximum number of retransmissions being reached without an acknowledgement being received for the PDU), and the RLC entity of the MS may report the radio link failure to one or more upper layers (e.g., to the RRC entity of the MS) of its protocol stack.

A MS may also detect radio link failures during other situations or other operations. For example, in terms of an example radio link failure, the reception of a threshold number of "out of sync" consecutive indications from lower layers triggers a timer at the MS to be started. When this timer at the MS expires, without an in-sync indication being provided, then the RLC entity (or other MS protocol entity) may notify the RRC entity of the MS of a radio link failure.

A third example of a detected radio link failure may occur during a random access procedure. Random access may be used by a MS in different situations, including for initial access to a BS when establishing a radio link with a BS, for a MS to move from RRC_idle state to RRC_connected state, to re-establish a radio link after a radio link failure, for a handover operation when UL synchronization needs to be established with the new BS, and other situations. If a problem or error occurs during a random access procedure, a radio link failure may be declared and reported to upper layers (e.g., to the RRC entity of the MS). For example, as part of random access, a MS may send a BS a random access request, and may receive a random access response from the BS that includes the timing command or timing information to allow the MS to perform UL transmissions to the BS. However, a retransmit counter may be incremented each time a random access request is sent to a BS, and a radio link failure may be declared when the retransmit counter reaches a threshold or maximum number of retransmissions without receiving a random access response from the BS. These are merely some examples where a radio link failure may be detected, and other types of radio link failures may also be detected.

In a first example implementation, the MS may be pre-configured (e.g., based on receiving a pre-configuration instruction from master BS) to perform one (or more) of the following operations in response to detecting a failed radio link (e.g., detecting a failed logical channel or failed radio bearer): 1) re-establish a RLC (radio link control) entity associated with the failed logical channel (or failed bearer); 2) re-establish RLC entities of the MS associated with all of a plurality of logical channels of the failed radio link between the MS and the secondary BS; 3) suspend a RLC (radio link control) entity associated with the failed logical channel (or failed bearer); 4) suspend RLC entities of the MS associated with all of a plurality of logical channels of the failed radio link between the MS and the secondary BS; and, 5) initiate a link or connection re-establishment procedure.

If the MS is pre-configured to either 3) suspend a RLC (radio link control) entity associated with the failed logical channel (or failed bearer) or 4) suspend RLC entities of the MS associated with all of a plurality of logical channels of the failed radio link between the MS and the secondary BS, then, in response to detecting the failed radio link (e.g., failed logical channel or failed bearer), the MS may perform the pre-configured suspend operation, send a radio link failure notification to the master BS, and await further instructions from the master BS. In an example implementation, the MS may then receive an instruction from the master BS that instructs the MS to perform one (or more) of the following operations: 1) re-establish a RLC (radio link control) entity associated with the failed logical channel (or failed bearer); 2) re-establish RLC entities of the MS associated with all of a plurality of logical channels of the failed radio link between the MS and the secondary BS; or 5)

initiate a link or connection re-establishment procedure. The MS may then perform the operation as instructed by the master BS.

According to a second example implementation, in response to detecting a radio link failure for a radio link between the MS and secondary BS, the MS may, for example, send a radio link failure notification to the master BS that may include logical channel ID or bearer ID (identifying the failed logical channel or failed bearer), and a BS ID identifying the secondary BS. The MS may suspend the RLC entity associated with the failed logical channel or failed radio bearer and await further instructions from the master BS. The MS may, for example, then receive an instruction from the master BS that instructs the BS to perform one of the following operations: 1) re-establish a RLC (radio link control) entity associated with the failed logical channel/or failed bearer; 2) re-establish RLC entities of the MS associated with all of a plurality of logical channels/or plurality of bearers of the failed radio link between the MS and the secondary BS; or 5) initiate a link or connection re-establishment procedure, e.g., which may result in multiple (or even all) protocol entities (e.g., PHY, MAC, RLC . . . ) of the MS that are associated with both the radio link between the MS and master BS and the radio link between the MS and the secondary BS being re-established by the MS. The MS may then perform the operation(s) identified by the instruction from the master BS.

Figure 3:
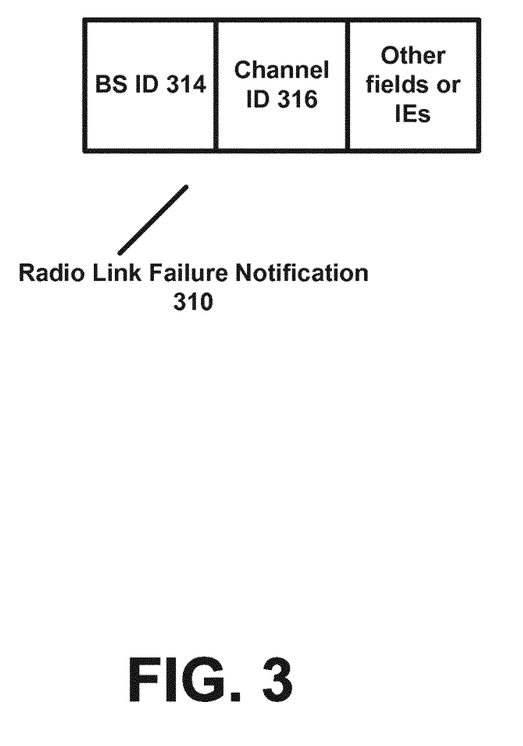
FIG. 3 is a diagram illustrating a radio link failure notification 310 according to an example implementation.

FIG. 3 is a diagram illustrating a radio link failure notification 310 according to an example implementation. Radio link failure notification 310 may be provided as, or may include, a MAC control element (MAC CE), or other control signal, or a radio resource control (RRC) signaling message, or other message. For example, the radio link failure notification 310 may include several fields and/or information elements, depending on the message that is used. According to an example, radio link failure notification 310 may include a base station identifier (BS ID) that identifies the secondary BS that is involved with the failed radio link, a channel ID (identifier) 316 (or a bearer ID) that identifies the logical channel (or bearer) that failed. Other fields or information elements may be included.

Figure 4:
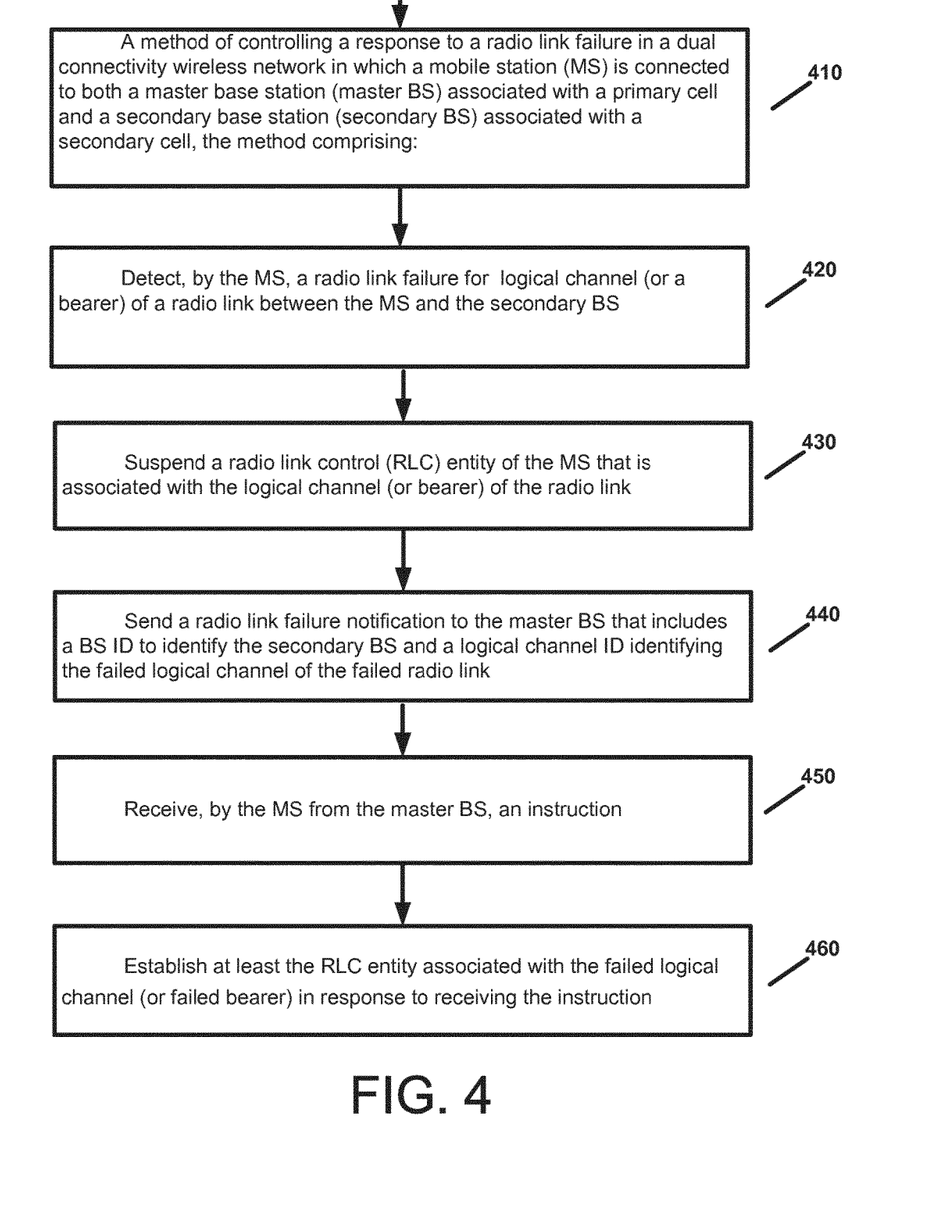
FIG. 4 is a flow chart illustrating operation of a mobile station according to an example implementation.

FIG. 4 is a flow chart illustrating operation of a mobile station according to an example implementation. FIG. 4, at block 410, relates to a technique or method for controlling a response to a radio link failure in a dual connectivity wireless network in which a mobile station (MS) is connected to both a master base station (master BS) associated with a primary cell and a secondary base station (secondary BS) associated with a secondary cell. The method or technique illustrated in FIG. 4 may include several operations. At operation 420, the MS detects a radio link failure for a logical channel of a radio link between the MS and the secondary BS. At operation 430, the MS suspends a radio link control (RLC) entity of the MS that is associated with the logical channel of the failed radio link. Suspending the RLC entity may include, for example, ceasing or stopping the transmission and/or reception of packets or data, and/or ceasing or stopping the operations or processing by the RLC entity. At operation 440, a radio link failure notification is sent by the MS to the master BS that includes a BS ID to identify the secondary BS and a logical channel ID identifying the failed logical channel of the failed radio link. The MS may send the radio link failure notification to the master BS in various ways. For example, the MS may directly send the radio link failure notification to the master BS over the link or connection between the MS and the master BS. At operation 450, the MS receives an instruction from the master BS. At operation 460, the MS re-establishes at least the RLC entity associated with the failed logical channel in response to receiving the instruction.

In an alternative example implementation, operation 460 includes at least re-establishing, by the MS in response to receiving the instruction, the RLC entities of the MS associated with all of the logical channels (or all of the bearers) of the failed radio link between the MS and secondary BS.

In another alternative example implementation, operation 460 includes the MS initiating the link or connection re-establishment procedure in response to receiving the instruction.

According to an example implementation, the MS initiating the connection re-establishment procedure may include the MS: 1) re-establishing at least a PHY (Physical layer) entities, a MAC (Media Access Control) entities, and a RLC (Radio Link Control) entities of the MS associated with all of the logical channels of the failed radio link between the MS and secondary BS, and 2) re-establishing, by the MS in response to receiving the instruction, the RLC entities of the MS associated with all of the logical channels of the failed radio link between the MS and secondary BS. at least a PHY entities, a MAC entities and a RLC entities of the MS associated with all of the logical channels of a radio link between the MS and master BS.

Figure 5:
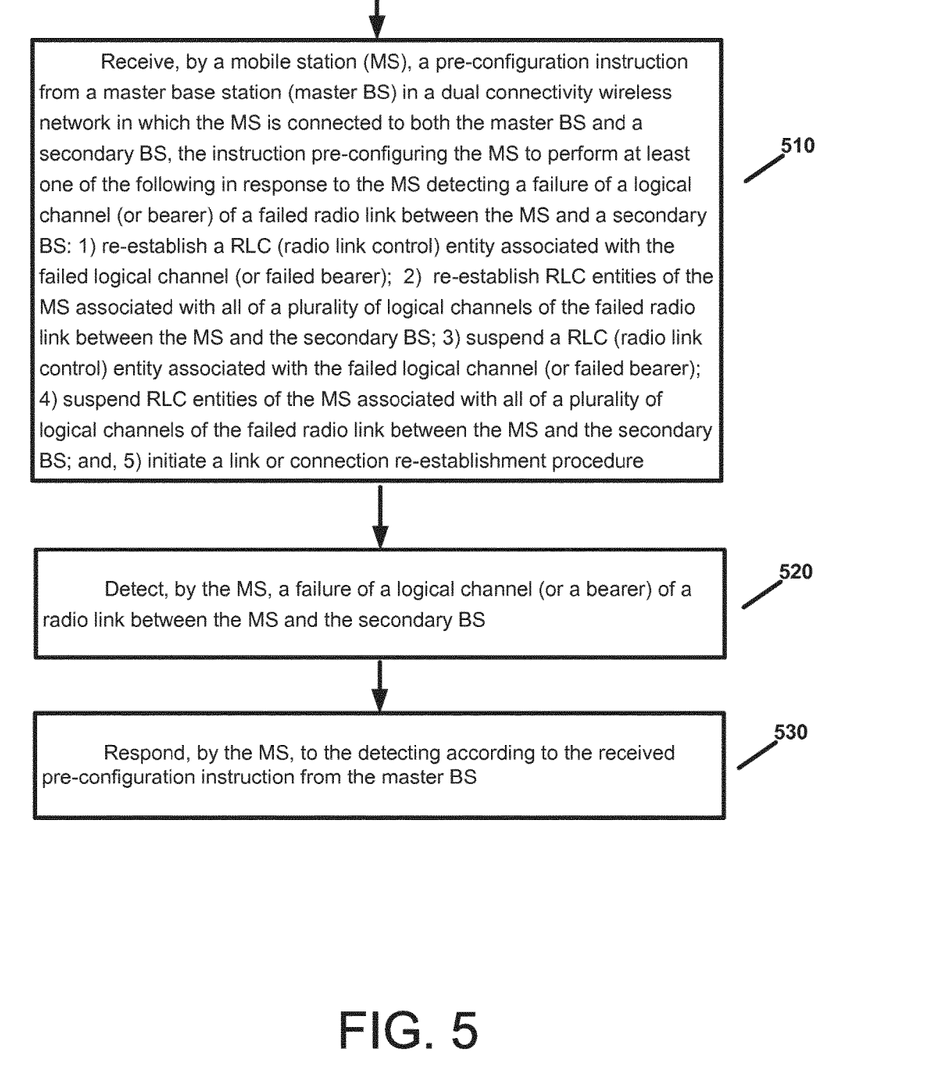
FIG. 5 is a flow chart illustrating operation of a mobile station according to another example implementation.

FIG. 5 is a flow chart illustrating operation of a mobile station according to another example implementation. At operation 510, a mobile station (MS) may receive a pre-configuration instruction from a master base station (master BS) in a dual connectivity wireless network in which the MS is connected to both the master BS and a secondary BS, the instruction pre-configuring the MS to perform at least one of the following in response to the MS detecting a failure of a logical channel of a failed radio link between the MS and a secondary BS: 1) re-establish a RLC (radio link control) entity associated with the failed logical channel (or failed bearer); 2) re-establish RLC entities of the MS associated with all of a plurality of logical channels of the failed radio link between the MS and the secondary BS; 3) suspend a RLC (radio link control) entity associated with the failed logical channel (or failed bearer); 4) suspend RLC entities of the MS associated with all of a plurality of logical channels of the failed radio link between the MS and the secondary BS; and, 5) initiate a link or connection re-establishment procedure. At operation 520, the MS detects a failure of a logical channel (or failure of a bearer) of a radio link between the MS and the secondary BS.

At operation 530, the MS responds to the detecting according to the received pre-configuration instruction from the master BS, e.g., the MS performs the operation(s) as instructed by the received pre-configuration instruction.

Figure 6:
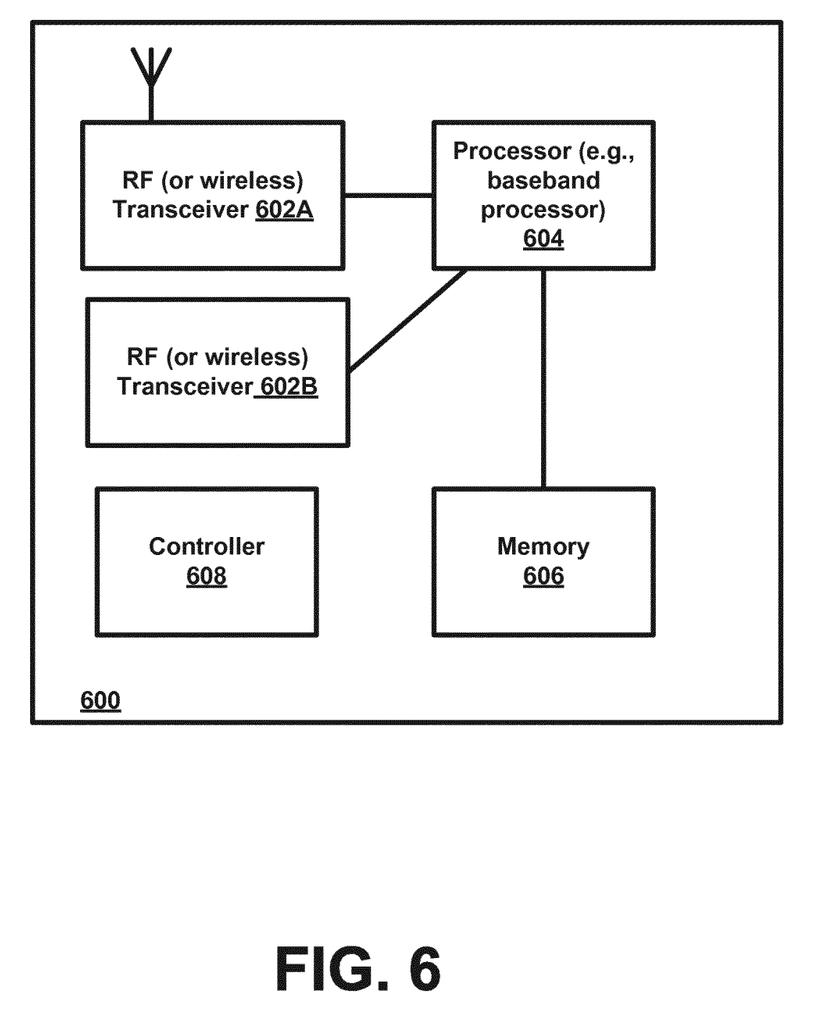
FIG. 6 is a block diagram of a wireless station (e.g., BS or MS) 600 according to an example implementation.

FIG. 6 is a block diagram of a wireless station (e.g., BS or MS) 600 according to an example implementation. The wireless station 600 may include, for example, two RF (radio frequency) or wireless transceivers 602A, 602B, where each wireless transceiver includes a transmitter to transmit signals and a receiver to receive signals. The wireless station also includes a processor 604 to execute instructions or software and control transmission and receptions of signals, and a memory 606 to store data and/or instructions.

Processor 604 may also make decisions or determinations, generate frames, packets or messages for transmission, decode received frames or messages for further processing, and other tasks or functions described herein. Processor 604, which may be a baseband processor, for example, may generate messages, packets, frames or other signals for transmission via wireless transceiver 602. Processor 604 may control transmission of signals or messages over a wireless network, and may receive signals or messages, etc., via a wireless network (e.g., after being down-converted by wireless transceiver 602, for example). Processor 604 may be programmable and capable of executing software or other instructions stored in memory or on other computer media to perform the various tasks and functions described above, such as one or more of the tasks or methods described above. Processor 604 may be (or may include), for example, hardware, programmable logic, a programmable processor that executes software or firmware, and/or any combination of these. Using other terminology, processor 604 and transceiver 602 together may be considered as a wireless transmitter/receiver system, for example.

In addition, referring to FIG. 6, a controller (or processor) 608 may execute software and instructions, and may provide overall control for the station 600, and may provide control for other systems not shown in FIG. 6, such as controlling input/output devices (e.g., display, keypad), and/or may execute software for one or more applications that may be provided on wireless station 600, such as, for example, an email program, audio/video applications, a word processor, a Voice over IP application, or other application or software.

In addition, a storage medium may be provided that includes stored instructions, which when executed by a controller or processor may result in the processor 604, or other controller or processor, performing one or more of the functions or tasks described above.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method of controlling a response to a radio link failure in a dual connectivity wireless network in which a mobile station (MS) is connected to both a master base station (master BS) associated with a primary cell and a secondary base station (secondary BS) associated with a secondary cell, the method comprising:
   detecting, by the MS, a radio link failure for a radio link between the MS and the secondary BS; and
   sending a radio link failure notification from the MS to the master BS,
   wherein the detecting the radio link failure for the radio link between the MS and the secondary BS comprises the MS detecting a failure of a logical channel of the radio link between the MS and the secondary BS,
   wherein the detecting the radio link failure for the radio link between the MS and the secondary BS comprises:
      the MS detecting reaching a maximum number of retransmissions defined for data packets of a radio link control (RLC) entity that processes data packets for a logical channel of the radio link between the MS and the secondary BS,
   wherein the radio link failure notification includes a BS ID to identify the secondary BS and a logical channel ID identifying the failed logical channel of the failed radio link, and wherein the radio link includes a radio bearer configured for the MS, the radio bearer being mapped to a plurality of logical channels including the logical channel.

2. The method of claim 1 and further comprising:
the MS initiating a link or connection re-establishment procedure for the failed radio link between the MS and secondary BS only in response to an instruction from the master BS.

3. The method of claim 1 and further comprising:
suspending a RLC entity of the MS that is associated with the logical channel of the radio link.

4. The method of claim 1 and further comprising:
suspending a RLC entity of the MS that is associated with the logical channel of the radio link;
receiving, by the MS from the master BS, an instruction to re-establish the suspended RLC entity of the MS associated with the failed logical channel; and
re-establishing the RLC entity associated with the failed logical channel in response to receiving the instruction.

5. The method of claim 1 and further comprising:
suspending at least a RLC entity of the MS that is associated with the failed logical channel of the radio link;
receiving, by the MS from the master BS, an instruction to re-establish the RLC entities of the MS associated with all of the logical channels of the failed radio link between the MS and the secondary BS; and
re-establishing, by the MS in response to receiving the instruction, the RLC entities of the MS associated with all of the logical channels of the failed radio link between the MS and secondary BS.

6. The method of claim 1 and further comprising:
suspending at least a RLC entity of the MS that is associated with the failed logical channel of the radio link;
receiving, by the MS from the master BS, an instruction to initiate a link or connection re-establishment procedure; and
the MS initiating the link or connection re-establishment procedure in response to receiving the instruction.

7. The method as in claim 1, wherein the radio link includes a radio bearer configured for the MS, the radio bearer being mapped to a plurality of logical channels including the logical channel,
wherein the MS includes a protocol stack, the protocol stack of the MS including a MAC entity,
wherein the method further comprises multiplexing of data from the radio bearer into the plurality of logical channels, and
wherein the protocol stack further includes plurality of third layer protocol entities including a physical (PHY) layer and a RLC layer, each of the third layer protocol entities being associated with the radio link between the MS and the secondary BS.

8. A method of controlling a response to a radio link failure in a dual connectivity wireless network in which a mobile station (MS) is connected to both a master base station (master BS) associated with a primary cell and a secondary base station (secondary BS) associated with a secondary cell, the method comprising:
detecting, by the MS, a radio link failure for logical channel of a radio link between the MS and the secondary BS;
suspending a radio link control (RLC) entity of the MS that is associated with the logical channel of the radio link; and
sending a radio link failure notification to the master BS that includes a BS ID to identify the secondary BS and a logical channel ID identifying the failed logical channel of the failed radio link,
wherein the detecting the radio link failure for the radio link between the MS and the secondary BS comprises:
the MS detecting reaching a maximum number of retransmissions defined for data packets of a RLC entity that processes data packets for a logical channel of the radio link between the MS and the secondary BS,
wherein the radio link failure notification includes a BS ID to identify the secondary BS and a logical channel ID identifying the failed logical channel of the failed radio link, and
wherein the radio link includes a radio bearer configured for the MS, the radio bearer being mapped to a plurality of logical channels including the logical channel.

9. The method of claim 8 and further comprising:
receiving, by the MS from the master BS, an instruction; and
re-establishing at least the RLC entity associated with the failed logical channel in response to receiving the instruction.

10. The method of claim 9 wherein the re-establishing comprises the MS re-establishing, by the MS in response to receiving the instruction, the RLC entity of the MS associated with the failed radio link between the MS and secondary BS.

11. The method of claim 9 wherein the re-establishing comprises the MS initiating a link or connection re-establishment procedure in response to receiving the instruction.

12. An apparatus for a communication device provided in a dual connectivity wireless network in which a mobile station (MS) is connected to both a master base station (master BS) associated with a primary cell and a secondary base station (secondary BS) associated with a secondary cell, the apparatus comprising at least one processor and at least one memory including computer instructions, when executed by the at least one processor, cause the apparatus to:
detect, by the MS, a radio link failure for a radio link between the MS and the secondary BS, and
send a radio link failure notification from the MS to the master BS,
wherein the apparatus being caused to detect the radio link failure for the radio link between the MS and the secondary BS comprises the apparatus being caused to detect, by the MS, a failure of a logical channel of the radio link between the MS and the secondary BS,
wherein the detecting the radio link failure for the radio link between the MS and the secondary BS comprises:
the MS detecting reaching a maximum number of retransmissions defined for data packets of a radio link control (RLC) entity that processes data packets for a logical channel of the radio link between the MS and the secondary BS,
wherein the radio link failure notification includes a BS ID to identify the secondary BS and a logical channel ID identifying the failed logical channel of the failed radio link, and
wherein the radio link includes a radio bearer configured for the MS, the radio bearer being mapped to a plurality of logical channels including the logical channel.

13. The apparatus of claim 12 wherein the radio link failure notification includes a secondary BS ID to identify the secondary BS and a logical channel ID identifying a failed logical channel of the failed radio link, wherein the radio link failure notification is sent from the MS to the master BS as a MAC Control Element or a Radio Resource control (RRC) signaling.

14. The apparatus of claim 12 wherein the apparatus is further caused to:
   suspend, by the MS, a RLC entity of the MS that is associated with the failed logical channel of the radio link.

15. The apparatus of claim 12 wherein the apparatus is further caused to:
   suspend a RLC entity of the MS that is associated with the logical channel of the radio link;
   receive, by the MS from the master BS, an instruction to re-establish the suspended RLC entity of the MS associated with the failed logical channel; and
   re-establish the RLC entity associated with the failed logical channel in response to receiving the instruction.

16. The apparatus of claim 12 wherein the apparatus is further caused to:
   suspend at least a RLC entity of the MS that is associated with the failed logical channel of the radio link;
   receive, by the MS from the master BS, an instruction to re-establish the RLC entities of the MS associated with all of the logical channels of the failed radio link between the MS and the secondary BS; and
   re-establish, by the MS in response to receiving the instruction, the RLC entities of the MS associated with all of the logical channels of the failed radio link between the MS and secondary BS.

17. The apparatus of claim 12 wherein the apparatus is further caused to:
   suspend at least a RLC entity of the MS that is associated with the failed logical channel of the radio link;
   receive, by the MS from the master BS, an instruction to initiate a link or connection re-establishment procedure; and
   initiate, by the MS, the link or connection re-establishment procedure in response to receiving the instruction.

\* \* \* \* \*